United States Patent [19]

de Zarauz

[11] 4,080,492

[45] Mar. 21, 1978

[54] BUTADIENE POLYMERIZATION PROCESS

[75] Inventor: Yves de Zarauz, Le Cendre, France

[73] Assignee: Compagnie Generale des Etablissements Michelin, Clermont-Ferrand, France

[21] Appl. No.: 668,238

[22] Filed: Mar. 18, 1976

Related U.S. Application Data

[63] Continuation-in-part of Ser. No. 582,120, May 30, 1975, abandoned.

[30] Foreign Application Priority Data

Jun. 5, 1974 France .................................. 74 19475

[51] Int. Cl.$^2$ ................................................ C08F 4/52
[52] U.S. Cl. .................................... 526/177; 526/176; 526/178; 526/335; 526/340
[58] Field of Search ................ 526/173, 176, 177, 178

[56] References Cited

U.S. PATENT DOCUMENTS

| 3,095,406 | 6/1963 | Short | 526/176 |
| 3,387,046 | 6/1968 | Cleary | 526/177 |
| 3,526,604 | 9/1970 | Wadsworth | 526/177 |
| 3,631,006 | 12/1971 | Hawkins | 526/176 |
| 3,716,495 | 2/1973 | Hsieh | 526/176 |

Primary Examiner—Paul R. Michl
Attorney, Agent, or Firm—Brumbaugh, Graves, Donohue & Raymond

[57] ABSTRACT

Homopolymers of butadiene and copolymers of butadiene with vinyl aromatic compounds or with other conjugated dienes, which polymers have a high content of trans-1,4 linkages and a low content of 1,2 linkages, are prepared by use of a novel anionic catalytic composition which comprises (a) an organo-lithium initiator and (b) a cocatalyst system comprising a compound of barium or strontium and an organometallic compound of a metal of Group IIB or IIIA of the Mendeleev periodic table of elements.

7 Claims, No Drawings

BUTADIENE POLYMERIZATION PROCESS

This application is a continuation-in-part application of U.S. application Ser. No. 582,120, filed May 30, 1975 now abandoned.

The present invention relates to a process of preparing homopolymers of butadiene and copolymers of butadiene either with other conjugated dienes or with vinyl aromatic compounds, which polymers have a low content of 1,2 linkages and a high content of trans-1,4 linkages, by the use of a new anionic catalytic composition.

A number of catalytic compositions are known which make it possible to prepare a solution in hydrocarbon media of butadiene polymers having a high degree of stereospecificity: high contents of cis-1,4 linkages (for instance, polybutadiene) or of trans-1,4 linkages, or else 1,2 linkages. The butadiene polymers of high content of trans-1,4 linkages (more than 95%) which are prepared in this manner behave more like plastics than like elastomers and for this reason cannot be used as the main component of the mixture serving to manufacture elastic objects and in particular tires.

It is also well known that homopolymers of butadiene and copolymers of butadiene either with other conjugated dienes or with vinyl aromatic compounds prepared in hydrocarbon medium by means of lithium catalytic compositions do not have a high steric purity. As a matter of fact, with the lithium catalytic compositions the butadiene polymers and copolymers obtained have, for intrinsic viscosities of the order of 2 or 3, a content of 1,2 linkages of the diene portion which is always greater than 6% and a content of trans-1,4 linkages which is always less than 60%. Thus the contents are as follows:

For polybutadienes and copolymers of butadiene
45% to 55% of trans-1,4
7% to 12% of 1,2
40% to 45% of cis-1,4

With lithium catalytic compositions the proportions in butadiene polymers of 1,2 linkages as compared to the 1,4 linkages can be slightly increased by recourse to certain artifices, for instance, by modifying the polarity of the reaction medium.

On the other hand, there are no methods for varying in butadiene polymers the content of trans-1,4 linkages within a wide range while retaining the content of 1,2 linkages at a low level.

The object of the present invention is to remedy this state of the art by providing a means which makes it possible to obtain butadiene polymers or copolymers having a high content of trans-1,4 linkages in the diene portions of these compounds either over the entire length of the chain of the polymer or only over a portion of its length, as well as a low content of 1,2 linkages.

Thus the object of the invention is to provide a process for homopolymerizing butadiene or copolymerizing butadiene either with other conjugated dienes or with vinyl aromatic compounds leading to the obtaining of products having a high content of more than about 70% of trans-1,4 linkages and at the same time a low content of less than about 5% of 1,2 linkages.

Accordingly, the present invention provides a process of homopolymerizing butadiene or copolymerizing butadiene with other conjugated dienes or with vinyl aromatic compounds to form products having simultaneously a high content of more than about 70% of trans-1,4 linkages and a low content of less than about 5% of 1,2 linkages which comprises reacting the monomers in a reaction medium in the presence of an added anionic catalytic composition comprising:
  a. an organo-lithium initiator and
  b. a cocatalyst system comprising a compound of barium or strontium and an organometallic compound of a metal of Group IIB or IIIA of the Mendeleeve periodic table of elements.

By "organo-lithium initiator" there is understood first of all, any organometallic compound comprising one or more carbon-lithium bonds, and secondly any ionicradical adduct of lithium and certain polynuclear aromatic hydrocarbons, and thirdly metallic lithium itself, as well as finally the oligomers produced by the addition of lithium to conjugated dienes or substituted styrenes.

As representative examples of the organo-lithium initiator the following compounds may be mentioned:

The alkyl organo-lithiums such as ethyl-lithium, n-butyl-lithium, isobutyl-lithium, sec.-butyl-lithium, ter.-butyl-lithium, isopropyl-lithium, n-amyl-lithium, isoamyl-lithium; the alkenyl organo-lithiums such as allyl-lithium, propenyl-lithium, isobutenyl-lithium; the "live" lithium polymers such as polybutadienyl-lithium, polyisoprenyl-lithium, and polystyryl-lithium; the dilithium polymethylenes such as 1,4-dilithium butane, 1,5-dilithium pentane, 1,20-dilithium eicosane; the aryl organo-lithiums such as benzyl-lithium, phenyl-lithium, 1,1-diphenyl-methyl-lithium; the polylithiums resulting from the reaction of metallic lithium with aryl-substituted ethylene compounds such as 1,1-diphenylethylene, trans-stilbene, tetra-phenylethylene; the radical ions such as lithium-naphthalene, lithium-anthracene, lithium-chrysene, lithium-diphenyl as well as the derivatives substituted by one or more alkyls.

With respect to the components of the cocatalyst system there is understood by "compound of barium or strontium": the hydrides $H_2Ba$ and $H_2Sr$; the mono or polyfunctional organic acid salts of the formulas (R — COO)$_2$Ba or Sr, $R_1$ — (COO)$_2$Ba or Sr in which R and $R_1$ are organic radicals, the first monovalent and the second divalent, not having other functions capable of inactivating the organo-lithium initiator, and the corresponding thio acids, as well as the mono or polyfunctional alcoholates and the corresponding thiolates; the mono or polyfunctional phenates and the corresponding thiophenates; the alcohol acid and phenol acid salts of barium or strontium and the corresponding thio products; barium or strontium β-diketonates such as the reaction products of barium or strontium with acetylacetone, dibenzoylmethane, thenoyltrifluoro-acetone, benzoyltrifluoroacetone, benzoyl-acetone; the organic derivatives of barium or strontium such as those of 1,1-diphenylethylene, 1,2-acenaphthylene, tetraphenylbutane, α-methyl-styrene or else those such as diphenyl barium or strontium, bis-cyclopentadienyl barium or strontium, the barium or strontium trialkylsilyls, barium or strontium triphenylsilyl; the mixed organic derivatives such as phenyl-barium iodide, methylstrontium iodide, barium or strontium salts of secondary amines; ketone metals such as barium or strontium benzophenone, barium or strontium cinnamone, and the corresponding alkyl products as well as the sulfided homologues; the radical ions of barium and of strontium such as those of naphthalene, anthracene, chrysene, diphenyl, etc.

As representative examples of the organo-metallic compound of a metal of Group IIB or IIIA of the Mendeleev periodic table of elements there may be mentioned: Dialkyl zinc or cadmium compounds such as diethyl zinc, diethyl cadmium; halogenated or non-halogenated organoaluminum compounds such as triethyl aluminum, tri-isobutyl aluminum, diethyl aluminum chloride, ethyl aluminum dicloride, ethyl aluminum sesquichloride, methyl aluminum sesquichloride; dialkyl aluminum hydrides such as diethyl aluminum hydride, diisobutyl aluminum hydride; and organoboron compounds.

The cocatalytic system may be formed in accordance with the following two preferred variants:

In accordance with the first variant, the different components of the cocatalytic system are dissolved separately in a separate hydrocarbon solvent, preferably identical to the one which will be used subsequently upon the polymerization of copolymerization reaction so as to be able to be introduced separately into the reaction medium.

In accordance with the second variant, the cocatalyst system is "preformed" by mixing the barium or strontium compound and the organometallic compound of a metal of Group IIB or IIIA within a hydrocarbon solvent. These preformed cocatalyst systems are characterized by the fact that they are more soluble in the hydrocarbon solvents and by the fact that they retain their high activity for long periods of time. This mixing between the two components of the cocatalyst system is accompanied, as a matter of fact, by a total or partial solubilizing of the barium or strontium compound and in particular of those which are normally insoluble in hydrocarbon media such as the hydrides, the acetylacetonates and most of the alcoholates. The result is thus that the use of the preformed cocatalytic system is particularly easy.

In accordance with the first variant, the components of the cocatalytic system dissolved in the hydrocarbon solvent are introduced separately into the reaction medium, either at the start of the reaction at the same time as the organo-lithium initiator in order to form the catalytic composition "in situ", or during the course of the polymerization jointly in small quantities or at a single time, or else one after the other in any order. This manner of procedure is justified primarily for barium or strontium compounds which are soluble in the solvents in question.

It will be understood that only as from the moment when the entire cocatalytic system which has been introduced into the reaction medium has reacted with the organo-lithium initiator will one benefit from the effect desired, namely the increase in the content of trans-1,4 linkages and the decrease in the content of 1,2 linkages. The result is that when the entire cocatalytic system is present from the very start of the reaction, one obtains products having a high content of trans-1,4 linkages and a low content of 1,2 linkages over the entire length of the butadiene polymer or copolymer.

On the other hand, when the components of the cocatalytic system are introduced during the reaction, either jointly in small quantities or one after the other, one can prepare products having several sequences and having different steric configurations, the addition of the cocatalytic system resulting in the formation of sequences high in trans-1,4 linkages and low in 1,2 linkages.

In accordance with the second variant, when the cocatalytic system is used in "preformed" form, one can add it to the organo-lithium initiator either at the start of the reaction in order to obtain a product having a content of trans-1,4 linkages which is constant from one end to the other of the macromolecular chains or during the reaction in one or more additions, depending on whether it is desired to have a modification of steric configuration only as from said addition or whether it is desired to have the modification of configuration progressively.

The catalytic composition used in the process of the invention has an activity which is spread over a wide range of concentrations of the catalyst and ratios of the components of the catalytic composition.

Depending on the conditions under which the reaction takes place (nature of solvent, the monomer or monomers present, temperature, etc.) the molar ratios between each of the components of the cocatalytic system and between one of the latter with either the organo-lithium initiator or the "live" lithium polymer or copolymer can be different in order to obtain given contents of trans-1,4 and 1,2 linkages. It will therefore be necessary to adjust these different molar ratios in accordance with the conditions under which one is operating and the steric configurations desired.

The result is that the optimum concentration for one component of the catalytst composition depends on the concentration of the other components of the catalyst composition. However, one can assign certain limits to the different molar ratios within which one will obtain high contents of trans-1,4 linkages and low contents of 1,2 linkages.

The said limits are:

$$0.2 \leq \frac{\text{mole } R^3 \text{ Me IIIA or } R^2 \text{ Me IIB}}{\text{mole of compound of Ba or Sr}} \leq 10$$

with $$0.25 \leq \frac{\text{mole of compound of Ba or Sr}}{\text{gram atom of Li}} \leq 5$$

and preferably $$0.5 \leq \frac{\text{mole } R^3 \text{ Me IIIA or } R^2 \text{ Me IIB}}{\text{mole of compound of Ba or Sr}} \leq 6$$

with $$0.5 \leq \frac{\text{mole of compound of Ba or Sr}}{\text{gram atom of Li}} \leq 1.5$$

with $R^3$ Me IIIA representing an organometallic compound of a metal of Group IIIA and $R^2$ Me IIB representing an organo-metallic compound of a metal of Group IIB.

By gram atom of lithium there is understood the quantity of active organo-lithium compound used which represents the difference between the total amount actually introduced and the minimum necessary to obtain a commencement of the polymerization (quantity serving, inter alia, to neutralize the residual impurities of the reaction media).

In accordance with the first variant of the process of the invention, a product having a high content of trans-1,4 linkages and a low content of 1,2 linkages over the entire length of the butadiene polymer or copolymer is obtained by introducing the catalytic composition at the start of the reaction.

In accordance with another variant, the process of the invention leads to butadiene polymers and copolymers having different or else progressive sequences and steric configurations depending on whether the components of the catalytic composition are added to the reaction medium one or more times, jointly or separately.

As representative examples of other conjugated dienes with which butadiene can be copolymerized, mention may be made of isoprene, 2,3-dimethyl-1,3-butadiene, 1,3-pentadiene, 2-methyl-1,3-pentadiene, and 2,4-hexadiene.

As representative examples of vinyl aromatic compounds with which butadiene can be copolymerized, mention may be made of styrene, ortho-, meta-, and para-methyl styrene or the commercial mixture "vinyltoluene", the di- and polymethyl styrenes, p-tertiobutyl-styrene, the vinylnaphthalenes, the methoxy styrenes, the halostyrenes, vinylmesitylene, vinyldurol, and divinylbenzene.

Mixtures in nonvulcanized state produced with the products obtained by the carrying out of the process of the invention due to their high content of trans-1,4 linkages and low content of 1,2 linkages have characteristics such as improved green strength, very high breaking force and elongation at rupture and better dimensional stability.

These mixtures of improved properties are then capable of leading to better rubbers which can be used in particular for the manufacture of tires.

The following nonlimitative examples are given solely in order to illustrate the invention.

EXAMPLE 1

Butadiene/Styrene Copolymerization by Means of the Catalytic Composition n-Butyl Lithium/Cinnamone-Barium/Triethyl Aluminum Preparation of the Cocatalyst System Since the cinnamone-barium complex is soluble in toluene, it was possible to study the specific influence of each of the components of the cocatalyst system, the ratio Ba/Al not being fixed for reasons of solubility in the reaction medium.

The cinnamone-barium complex is prepared in a 250 cc. Steinie bottle in an atmosphere of rectified nitrogen, by dissolving 0.1 mole of cinnamone (1,5-diphenyl-1,4-pentadiene-3-one) in 50 cc. of tetrahydrofurane in which 1.5 g. of finely divided metallic barium are present in suspension. After this mixture has been agitated for about 20 hours at room temperature, a red solution is obtained, which is filtered. This solution is evaporated under vacuum. The brownish-red deposit obtained, after being washed twice with heptane, is dissolved in toluene, still under an atmosphere of rectified nitrogen, so as to obtain an 0.025 M solution of barium.

Copolymerization

Two series of copolymerization experiments are carried out by introducing into 250 cc. Steinie bottles, as catalytic composition:
- variable amounts of from 0 to $200 \times 10^{-6}$ moles of triethyl aluminum
- $50 \times 10^{-6}$ moles of active n-butyl-lithium, as defined above.

In the first series, no barium compound is used. $50 \times 10^{-6}$ moles of cinnamone-barium are introduced into each of the bottles of the second series.

The copolymerization is carried out in the presence of cyclohexane (123 g. per 250 cc. Steinie bottle) with 9.225 g. of butadiene and 3.075 g. of styrene per bottle.

The reaction flasks are placed in a thermostatically controlled tank maintained at 70° C. where they are agitated for a variable period of time so as to obtain samples corresponding to increasing percentages of conversion.

The results obtained at 50% conversion are set forth in Tables IA and 1B below:

TABLE IA

| First Series ([Ba] = 0) | | | | | |
|---|---|---|---|---|---|
| Moles of triethyl-Al $\times 10^{-6}$ (per Steinie bottle) | Time for obtaining a conversion rate of 50% | % trans-1,4 | % 1,2 | % of total weight of styrene present in the copolymer | $\eta$ |
| 0 | 30 mn. | 53 | 8 | 2 | 2.6 |
| 100 | <30 mn. | 54 | 8 | 2 | 1.2 |
| 200 | <30 mn. | 54 | 8 | 2 | 0.9 |

TABLE IB

| Second Series ([Ba] = $50 \times 10^{-6}$ moles/bottle) | | | | | |
|---|---|---|---|---|---|
| Moles of triethyl-Al $\times 10^{-6}$ (per Steinie bottle) | Time for obtaining a conversion rate of 50% | % trans-1,4 | %1,2 | % of total weight of styrene present in the copolymer | $\eta$ |
| 0 | 300 mn. | 54 | 9 | 16 | 2.0 |
| 25 | 210 mn. | 62.5 | 6 | 12.5 | 1.6 |
| 50 | 150 mn. | 75 | 4 | 11.5 | 1.3 |
| 75 | 105 mn. | 80 | 3.5 | 9 | 1.1 |
| 100 | 90 mn. | 78 | 5.5 | 7.5 | 1.0 |
| 200 | 50 mn. | 76 | 6 | 5.5 | 0.9 |

When examining these results one notes the influence of each of the compounds introduced on the steric configuration of the polymers obtained (% of trans-1,4 and % of 1,2 linkages) and subsidiarily on the reaction kinetics, the intrinsic viscosity reached and the method of incorporating the styrene.

With respect to the influence on the steric configuration and in particular on the contents of trans-1,4 linkages and of 1,2 linkages, it is noted that the expected effect is obtained only when the three components of the catalytic composition are present together in the reaction medium; if one or the other is absent, a steric configuration is obtained which is rather close to the one obtained with n-butyl-lithium used by itself.

EXAMPLE 2

Polymerization of Butadiene by Means of n-Butyl Lithium and a "Preformed" Cocatalytic System: Barium Acetylacetonate/Trialkyl Aluminum Preparation of Cocatalyst System:

The barium acetylacetonate is prepared directly by reaction of the acetylacetone and barium hydroxide in anhydrous methanol medium.

The product prepared in insoluble in hydrocarbons. A soluble cocatalytic system is obtained by mixing the barium acetylacetonate and the trialkyl aluminum in the presence of a hydrocarbon solvent under a rectified-nitrogen atmosphere for 15 minutes at room temperature.

Three cocatalytic systems are prepared:

System A: 5.32 millimoles of barium acetylacetonate having been placed in suspension in 170 g. of normal heptane, 23.4 millimoles of commercial triethyl aluminum of a concentration of 0.92 M are added. After agitation, a clear solution of $2.9 \times 10^{-2}$ M barium and $11.3 \times 10^{-2}$ M aluminum is obtained.

System B: To 5.85 millimoles of barium acetylacetonate suspended in 170 g. of toluene there are added 26.3 millimoles of commercial triethyl aluminum of a concentration of 0.92 M. After agitation there is obtained a clear solution of a concentration of $3.2 \times 10^{-2}$ M barium and $11.6 \times 10^{-2}$ M aluminum.

System C: To 5.58 millimoles of barium acetylacetonate suspended in 170 g. of heptane there are added 25.1 millimoles of commercial tri-isobutyl aluminum of a concentration of 0.79 M. Upon agitation there is obtained a clear solution of a concentration of $2.4 \times 10^{-2}$ barium and $11.8 \times 10^{-2}$ M aluminum.

Polymerization

These three cocatalytic systems are used in combination with n-butyl-lithium to polymerize butadiene dissolved in heptane (first series of experiments) or in toluene (second series of experiments).

These series of experiments are carried out in 250 cc. Steinie bottles closed by a rubber stopper through which the different ingredients necessary for the polymerization are introduced. Into these bottles, under the pressure of rectified nitrogen (about 1 bar) there are introduced 123 g. of solvent (heptane or toluene) and then 12.3 g. of butadiene followed by one of the preceding cocatalytic systems and finally the n-butyl-lithium. The bottles are then placed in a tank which is maintained constant by thermostat at 60° C. and are agitated therein for 3 hours.

At the end of these 3 hours, the polymerizations are stopped by introducing into said tank 0.25 cc. of a solution of methanol in toluene of 60 g./liter. A phenolic antioxidant is also introduced (Agerite Geltrol manufactured by Vanderbilt) (2 cc. of a 246 g./liter solution).

The polymers are then recovered by coagulation by means of a methanol-acetone mixture and dried under vacuum in an oven (80° C. - 0.2 bar - 15 hours).

The percentages of conversion of butadiene into polybutadiene which have been obtained, the intrinsic viscosities established at 25° C. in 1 g./liter solution in toluene and the steric configurations are determined on the samples thus obtained.

The results obtained are summarized in Tables IIA and IIB below:

TABLE IIA

First Series (solvent: heptane)

| Cocatalytic system | | Active initiator* n-BuLi ($\times 10^{-6}$ moles) | % Conversion | $\eta$ | % trans-1,4 | % 1,2 |
|---|---|---|---|---|---|---|
| (Control polymers) | | 50 | 100 | 2.4 | 51 | 8 |
| (A) | $42 \times 10^{-6}$ moles Ba | 66 | 54 | 1.6 | 77 | 4 |
| | $164 \times 10^{-6}$ moles Al | 85 | 61 | 1.5 | 83 | 3 |
| (B) | $45 \times 10^{-6}$ moles Ba | 41 | 59 | 1.8 | 73 | 4 |
| | $163 \times 10^{-6}$ moles Al | 77 | 71 | 1.6 | 82 | 4 |
| (C) | $34 \times 10^{-6}$ moles Ba | 45 | 56 | 1.7 | 73 | 4 |
| | $167 \times 10^{-6}$ moles Al | 81 | 70 | 1.5 | 83 | 3 |

*In addition to the quantities indicated, counted as active, there are added additional quantities of n-BuLi intended to destroy the residual impurities of the reaction medium.

TABLE IIB

Second Series (solvent: toluene)

| Cocatalytic system | | Active initiator* n-BuLi ($\times 10^{-6}$ moles) | % Conversion | $\eta$ | % trans-1,4 | % 1,2 |
|---|---|---|---|---|---|---|
| (Control polymer) | | 50 | 100 | 2.5 | 51 | 12 |
| (A) | $42 \times 10^{-6}$ moles Ba | 28 | 24 | 0.8 | 74 | 5 |
| | $164 \times 10^{-6}$ moles Al | 66 | 78 | 1.3 | 72 | 5 |
| (B) | $45 \times 10^{-6}$ moles Ba | 50 | 58 | 1.0 | 72 | 5 |
| | $163 \times 10^{-6}$ moles Al | 77 | 83 | 1.1 | 70 | 5 |
| (C) | $34 \times 10^{-6}$ moles Ba | 50 | 40 | 1.0 | 76 | 5 |

TABLE IIB-continued

Second Series (solvent: toluene)

| Cocatalytic system | Active initiator* n-BuLi ($\times 10^{-6}$ moles) | % Conversion | $\eta$ | % trans-1,4 | % 1,2 |
|---|---|---|---|---|---|
| 167 $\times 10^{-6}$ moles Al | 86 | 70 | 1.2 | 78 | 5 |

*In addition to the quantities indicated, counted as active, there are added additional quantities of n-BuLi intended to destroy the residual impurities of the reaction medium.

EXAMPLE 3

Polymerization of Butadiene by Means of n-Butyl Lithium and a "Preformed" Cocatalytic System: Dibenzoylmethane Barium/Triethyl Aluminum

Preparation of Cocatalyst System

The dibenzoylmethane barium chelate is prepared directly from dibenzoylmethane and barium hydroxide, in anhydrous methanol medium.

The product prepared is insoluble in hydrocarbons. The cocatalytic system is prepared by mixing 5.2 millimoles of dibenzoylmethane barium and 26 millimoles of commercial triethyl aluminum of a concentration of 0.84 M in an atmosphere of rectified nitrogen suspended in 123 g. of heptane. This mixture is brought to 60° C. for ½ hour while agitating so that the chelate dissolves. There is then obtained a yellow solution which remains clear after it has returned to room temperature. It has a concentration of about $3 \times 10^{-2}$ M barium and $15 \times 10^{-2}$ M aluminum.

Polymerization

This cocatalytic system is used in combination with n-butyl lithium to polymerize butadiene in solution in heptane.

The polymerization conditions are the same as those described previously (Steinie bottles of 250 cc., 123 g. of heptane and 12.3 g. of butadiene, 3 hours at 60° C.).

Results Obtained

TABLE III

| Cocatalytic system | Active n-BuLi | % Conversion | $\eta$ | % trans-1,4 | % 1,2 |
|---|---|---|---|---|---|
| 20 $\times 10^{-6}$ moles Ba<br>100 $\times 10^{-6}$ moles Al | 12 $\times 10^{-6}$ moles | 55 | 2.0 | 77 | 2.9 |
| — | 20 $\times 10^{-6}$ moles | 65 | 1.9 | 81 | 2.6 |
| — | 28 $\times 10^{-6}$ moles | 70 | 1.9 | 82 | 3.0 |
| 40 $\times 10^{-6}$ moles Ba<br>200 $\times 10^{-6}$ moles Al | 40 $\times 10^{-6}$ moles | 63 | 1.2 | 86 | 2.0 |
| 60 $\times 10^{-6}$ moles Ba<br>300 $\times 10^{-6}$ moles Al | 28 $\times 10^{-6}$ moles | 47 | 1.2 | 78 | 2.6 |
| — | 36 $\times 10^{-6}$ moles | 51 | 1.1 | 87 | 2.8 |
| — | 59 $\times 10^{-6}$ moles | 61 | 1.1 | 90 | 2.4 |
| — | 75 $\times 10^{-6}$ moles | 65 | 1.1 | 90 | 2.7 |
| — | 122 $\times 10^{-6}$ moles | 74 | 0.9 | 81 | 4.2 |

EXAMPLE 4

Copolymerization of Butadiene and Styrene by Means of n-Butyl Lithium and the "Preformed" Cocatalytic System of Example 3

The same dibenzoylmethane barium triethyl aluminum cocatalytic system is used.

The copolymerization is carried out in 250 cc. Steinie bottles as previously, under the same experimental conditions.

Into each of the reaction flasks there are introduced:
123 g. of heptane
12.3 g. of monomers: 9.225 g. of butadiene and 3.075 g. of styrene (namely 25% of the charge)
65 $\times 10^{-6}$ moles of active n-BuLi
60 $\times 10^{-6}$ moles of cocatalytic complex, calculated as barium (and therefore accompanied by 300 $\times 10^{-6}$ moles of Al)

At 80° C., the results obtained, as a function of the time of the reaction, are as follows:

TABLE IV

| Time | % Conversion reached | % in total weight of styrene present in the copolymer | Steric configuration of the Polydiene portion | |
|---|---|---|---|---|
| | | | % trans-1,4 | % 1,2 |
| 25 min. | 28 | 9 | 86 | 4 |
| 60 min. | 56 | 10 | 86 | 4 |
| 120 min. | 71 | 13 | 85 | 4 |
| 180 min. | 84 | 15 | 86 | 4 |
| 18 hrs. | 94 | 21 | 86 | 4 |

The final copolymer obtained after the end of 18 hours had an intrinsic viscosity of 1.1.

EXAMPLE 5

Butadiene-Styrene Copolymerization by Means of the Catalytic Composition n-Butyl Lithium/Barium Nonylphenate/Triethyl Aluminum or Diethyl Zinc

Preparation of the Cocatalyst System

The barium nonylphenate is prepared by contacting nonylphenol (0.02 mole) and barium hydroxide (0.01 mole of Ba(OH)$_2$) in the presence of 100 cc. of toluene. The mixture is agitated in the hot (60° - 80° C.) until the barium hydroxide has entirely disappeared. About half the solvent is evaporated in vacuum so as to carry over all of the water formed and the concentrated solution is then made up to 100 cc. by means of fresh toluene. In this way there is obtained a solution of anhydrous barium nonylphenate in toluene of a concentration of about 1/10 M.

Copolymerization

Butadiene and styrene are copolymerized in 250 cc. Steinie bottles, into which there are introduced:
- heptane; 123 g.
- butadiene; 9.225 g.
- styrene; 3.075 g.
- n-butyl-lithium; $50 \times 10^{-6}$ moles (calculated as active product)
- barium nonylphenate; $50 \times 10^{-6}$ moles In order to complete the catalytic composition there are added:
- either $100 \times 10^{-6}$ moles of triethyl aluminum or
- $100 \times 10^{-6}$ moles of diethyl zinc.

In the case of the control test, neither of these two compounds is added.

The copolymerization is carried out at 70° C. for variable periods of time set forth in Table V in which the results obtained are entered.

TABLE V

| | Time in minutes | % Conversion | % of total weight of styrene present in the copolymer | % trans-1,4 | % 1,2 |
|---|---|---|---|---|---|
| [Al] = [Zn] = 0 | 45 | | | | |
| | 60 | 45 | 13 | 52 | 11 |
| | 90 | | | | |
| | 120 | 58 | 16 | 53 | 10 |
| | 180 | | | | |
| [Al] = 100 μ moles | 45 | | | | |
| | 60 | 46 | 9 | 71 | 5 |
| | 90 | | | | |
| | 120 | | | | |
| | 180 | 72 | 12 | 72 | 4 |
| [Zn] = 100 μ moles | 45 | 37 | 8 | 75 | 5 |
| | 60 | | | | |
| | 90 | 59 | 8 | 75 | 4 |
| | 120 | | | | |
| | 180 | 72 | 13 | 77 | 4 |

EXAMPLE 6

Copolymerization of Butadiene-Styrene and Copolymers having Two Different Sequences with Steric Configuration of Their Own This copolymer is obtained by adding, during the polymerization, one of the three components of the catalytic composition, triethyl aluminum in the present case, the n-butyl-lithium and the barium compound being added together upon the start of the reaction.

Into a 250 cc. Steinie bottle there are added, in all cases under an atmosphere of rectified nitrogen, 123 g. of heptane, 9.225 g. of butadiene, 3.075 g. of styrene, $50 \times 10^{-6}$ moles of active n-butyl lithium, $50 \times 10^{-6}$ moles of barium nonylphenate prepared as in the preceding example.

The mixture is allowed to copolymerize for 1½ hours at 70° C.

The percentage conversion reached is 54%. The copolymer contains 16% styrene and shows the following steric configuration: 53% trans-1,4 and 10%, 1,2 (in its polybutadiene portion).

Whereupon $100 \times 10^{-6}$ moles of triethyl aluminum are added per Steinie bottle whereupon the polymerization is allowed to proceed at 70° C. for an hour and a half. The final copolymer contains 14% styrene. Moreover, on the average 61% of the butadiene links are in trans-1,4 form and 8% in 1,2. The overall percentage of conversion is 76%.

This means that the resultant copolymer has two sequences, namely:
- the first, representing 71% of the total copolymer, contains on the one hand 16% styrene and 53% trans-1,4% and on the other hand 10% 1,2 for the steric configuration of the polybutadiene portion,
- the second, representing 29% of the total copolymer, contains on the one hand 9% styrene and on the other hand 79% trans-1,4 and 4% of 1,2, for the polybutadiene portion.

EXAMPLE 7

Polymerization of Butadiene by Means of n-Butyl Lithium and a "Preformed" Cocatalytic System: Barium Alcoholate/Organo-Aluminum, Chlorinated or Nonchlorinated

Preparation of the Cocatalyst System

Various barium alcoholates and various organoaluminum compounds are used to preform different cocatalytic systems under the following general conditions:

About 2 g. of barium alcoholate are introduced into 250 cc. Steinie flasks under an atmosphere of rectified nitrogen. 100 cc. of heptane are added and then an amount of alkyl or chloro-alkyl aluminum as indicated in the following table. The flasks are then placed in a tank which is maintained by thermostat at 60° C. in which they are agitated for six hours. The barium alcoholate which may still not have dissolved is then filtered off under an atmosphere of rectified nitrogen and the amount of barium in solution is determined.

In Table VIIA below there are given for each of the alcoholates and organo-aluminums used the quantities of product introduced (for 100 cc. of heptane.), the concentration of barium (in moles/liter) obtained after dissolving and filtration, as well as the yield of dissolved barium with reference to the quantity of barium alcoholate introduced, and the reference to the cocatalytic system thus prepared:

TABLE VIIA

| Barium Alcoholate | Organo-aluminum | Moles of barium alcoholate | Gram atoms of aluminum | Final concentration of Ba-alcoholate in mole/liter | Yield % | Ref. |
|---|---|---|---|---|---|---|
| | Triethyl aluminum | $8.6 \times 10^{-3}$ | $25.8 \times 10^{-3}$ | $7.4 \times 10^{-2}$ | 86 | A |
| | | $9.05 \times 10^{-3}$ | $18.1 \times 10^{-3}$ | $4.5 \times 10^{-2}$ | 49.8 | B |
| | | $9.5 \times 10^{-3}$ | $9.5 \times 10^{-3}$ | $1.5 \times 10^{-2}$ | 15.9 | C |
| Barium methanolate | Tri-iso- | $7.3 \times 10^{-3}$ | $21.8 \times 10^{-3}$ | $1.9 \times 10^{-2}$ | 26 | D |

TABLE VIIA-continued

| Barium Alcoholate | Organo-aluminum | Moles of barium alcoholate | Gram atoms of aluminum | Final concentration of Ba-alcoholate in mole/liter | Yield % | Ref. |
|---|---|---|---|---|---|---|
| | butyl aluminum | $8.0 \times 10^{-3}$ | $16.0 \times 10^{-3}$ | $1.6 \times 10^{-2}$ | 20 | E |
| | | $8.9 \times 10^{-3}$ | $8.9 \times 10^{-3}$ | $0.75 \times 10^{-2}$ | 8.4 | F |
| | | $8.8 \times 10^{-3}$ | $26.3 \times 10^{-3}$ | $2.9 \times 10^{-2}$ | 32.8 | G |
| | Triethyl aluminum | $9.15 \times 10^{-3}$ | $18.3 \times 10^{-3}$ | $1.5 \times 10^{-2}$ | 16.4 | H |
| | | $9.5 \times 10^{-3}$ | $9.5 \times 10^{-3}$ | $0.5 \times 10^{-2}$ | 5.2 | I |
| Barium ethanolate | Ethyl aluminum sesquichloride | $8.0 \times 10^{-3}$ | $24.0 \times 10^{-3}$ | $2.3 \times 10^{-2}$ | 28.7 | J |
| | | $8.6 \times 10^{-3}$ | $17.2 \times 10^{-3}$ | $1.15 \times 10^{-2}$ | 13.4 | K |
| | | $9.2 \times 10^{-3}$ | $9.2 \times 10^{-3}$ | $0.3 \times 10^{-2}$ | 3.3 | L |
| | Triethyl aluminum | $9.1 \times 10^{-3}$ | $27.2 \times 10^{-3}$ | $6.2 \times 10^{-2}$ | 68.2 | M |
| | | $9.3 \times 10^{-3}$ | $18.6 \times 10^{-3}$ | $5.5 \times 10^{-2}$ | 59.2 | N |
| | Ethyl Aluminum sesquichloride | $8.3 \times 10^{-3}$ | $25.0 \times 10^{-3}$ | $1.85 \times 10^{-2}$ | 22.2 | O |
| | | $8.8 \times 10^{-3}$ | $17.6 \times 10^{-3}$ | $2.6 \times 10^{-2}$ | 29.6 | P |
| Barium tertio-butanolate | Tri-iso-butyl aluminum | $7.9 \times 10^{-3}$ | $23.7 \times 10^{-3}$ | $4.85 \times 10^{-2}$ | 61.5 | Q |
| | | $8.5 \times 10^{-3}$ | $17.0 \times 10^{-3}$ | $3.95 \times 10^{-2}$ | 46.5 | R |
| | Ethyl aluminum dichloride | $8.05 \times 10^{-3}$ | $24.2 \times 10^{-3}$ | $3.67 \times 10^{-2}$ | 45.6 | S |
| | | $8.6 \times 10^{-3}$ | $17.2 \times 10^{-3}$ | $0.35 \times 10^{-2}$ | 4 | T |

Polymerizations

With these cocatalytic systems butadiene is polymerized under the following conditions:
Into a 250 cc. Steinie bottle there are introduced:
heptane; 123 g.
butadiene; 12.3 g.
cocatalytic system; $50 \times 10^{-6}$ moles of barium
active n-butyl lithium: quantity indicated in the following table The polymerization reaction is carried out with agitation for 14 hours at 70° C.

The results obtained with the different cocatalytic systems are set forth in Table VIIIB:

EXAMPLE 8

Polymerization of Butadiene by Means of n-Butyl Lithium and a "Preformed" Cocatalytic System: Strontium Alcoholate/Organo-Aluminum Compound, Chlorinated or Not Preparation of the Cocatalytic Systems Conditions indentical to those of the preceding examples (except agitation for 7 hours at 70° C. instead of 6 hours at 60° C.).

The quantities indicated also correspond to 100 cc. of heptane.

TABLE VIIIA

| Strontium alcoholate | Organo-aluminum compound | Moles of strontium alcoholate | Gram atoms of aluminum | Final concentration of Sr alcoholate in moles/liter | Yield % | Ref. |
|---|---|---|---|---|---|---|
| Strontium methanolate | Triethyl aluminum | $8.6 \times 10^{-3}$ | $25.9 \times 10^{-3}$ | $2.7 \times 10^{-2}$ | 31.4 | U |
| | Diethyl aluminum chloride | $8.15 \times 10^{-3}$ | $24.5 \times 10^{-3}$ | $0.95 \times 10^{-2}$ | 11.6 | V |
| Strontium ethanolate | Ethyl aluminum sesquichloride | $7.8 \times 10^{-3}$ | $23.4 \times 10^{-3}$ | $1.05 \times 10^{-2}$ | 13.5 | W |

Polymerization

The same conditions as in the preceding example except
polymerization for 6 hours at 70° C. with $50 \times 10^{-6}$ moles of strontium alcoholate per reaction flask.

TABLE VIIB

| Cocatalytic system | Moles of active BuLi $\times 10^{-6}$ | % Conversion | $\eta$ | % trans-1,4 | % 1,2 |
|---|---|---|---|---|---|
| A (methanolate - Et$_3$Al) | 127 | 93 | 1.41 | 86 | 3 |
| B (methanolate - Et$_3$Al) | 99 | 99.5 | 1.43 | 85 | 3 |
| D (methanolate - iso Bu$_3$Al) | 56.5 | 97.5 | 0.72 | 88 | 3 |
| G (ethanolate - Et$_3$Al) | 56.5 | 73 | 1.66 | 79 | 3 |
| M (Tert-butanolate-Et$_3$Al) | 103.5 | 94.5 | 1.65 | 83 | 3 |
| N (Tert-butanolate-Et$_3$Al) | 56.5 | 97.5 | 2.15 | 85 | 4 |
| O (Tert-butanolate-Et$_3$Cl$_3$Al$_2$) | 80 | 94 | 0.61 | 87 | 2 |
| P (Tert-butanolate-Et$_3$Cl$_3$Al$_2$) | 33 | 98 | 0.91 | 85 | 3 |
| Q (Tert-butanolate-iso Bu$_3$Al) | 141 | 100 | 1.28 | 81 | 3 |
| R (Tert-butanolate-iso Bu$_3$Al) | 80 | 98 | 1.90 | 78 | 5 |

TABLE VIIIB

| Cocatalytic system | Moles active BuLi × $10^{-6}$ | % Conversion | $\eta$ | % trans 1,4 | % 1,2 |
|---|---|---|---|---|---|
| | 23.5 | 94 | 0.76 | 80 | 5 |
| | 42.3 | 99 | 0.81 | 82 | 4 |
| U (methonolate-Et$_3$Al) | 61.1 | 100 | 0.83 | 81 | 4 |
| | 94 | 100 | 0.82 | 81 | 5 |

EXAMPLE 9

Polymerization of Butadiene by Means of n-Butyl Lithium and a "Preformed" Cocatalytic System: Barium Hydride/Organo-Aluminum Compound, Chlorinated or Not

Preparation of the Cocatalytic Systems

The conditions of preparation are identical to those of Example 7 (6 hours at 60° C.), the two grams of barium alcoholate being replaced by three grams of barium hydride.

Two series of cocatalytic systems were prepared, one in heptane (100 cc. per Steinie flask) and the other in toluene (20 cc. per flask).

In Tables IXA and IXB below, there are given for each of the two series the quantities of products used per Steinie bottle, the final concentration of barium in the solution obtained after filtration as well as the yield of barium as previously and the reference to the preparation.

TABLE IXA

Preparation in heptane (100 cc. per Steinie bottle)

| Organo-aluminum compound | Gram atoms of aluminum | Moles H$_2$Ba | Final concentration of H$_2$Ba in moles/liter | Yield % | Ref. |
|---|---|---|---|---|---|
| | 20.7 × $10^{-3}$ | 20.7 × $10^{-3}$ | 1.5 × $10^{-2}$ | 9 | I |
| Et$_3$Al | 53.6 × $10^{-3}$ | 26.8 × $10^{-3}$ | 2.4 × $10^{-2}$ | 12 | II |
| | 58.2 × $10^{-3}$ | 19.4 × $10^{-3}$ | 1.7 × $10^{-2}$ | 12 | III |
| | 24.9 × $10^{-3}$ | 24.9 × $10^{-3}$ | 0.21 × $10^{-2}$ | 1.2 | IV |
| Et$_3$Al$_2$Cl$_3$ | 53.2 × $10^{-3}$ | 26.6 × $10^{-3}$ | 4.2 × $10^{-2}$ | 24 | V |
| | 78.3 × $10^{-3}$ | 26.1 × $10^{-3}$ | 6.4 × $10^{-2}$ | 43 | VI |
| | 23.6 × $10^{-3}$ | 23.6 × $10^{-3}$ | 0.06 × $10^{-2}$ | 0.3 | VII |
| EtCl$_2$Al | 46.4 × $10^{-3}$ | 23.2 × $10^{-3}$ | 0.1 × $10^{-2}$ | 0.6 | VIII |
| | 90.3 × $10^{-3}$ | 30.1 × $10^{-3}$ | 0.1 × $10^{-2}$ | 0.5 | IX |
| | 20.2 × $10^{-2}$ | 20.2 × $10^{-3}$ | 0.15 × $10^{-2}$ | 0.9 | X |
| Et$_2$ClAl | 30.4 × $10^{-3}$ | 15.2 × $10^{-3}$ | 0.18 × $10^{-2}$ | 1.4 | XI |
| | 43.2 × $10^{-3}$ | 14.4 × $10^{-3}$ | 0.6 × $10^{-2}$ | 5.8 | XII |

TABLE IXB

Preparation in toluene (20 cc. per Steinie Bottle)

| Organo-aluminum compound | Gram atoms of aluminum | Moles H$_2$Ba | Final concentration of H$_2$Ba in moles/liter | Yield % | Ref. |
|---|---|---|---|---|---|
| | 21.0 × $10^{-3}$ | 21.0 × $10^{-3}$ | 7.3 × $10^{-2}$ | 11.5 | XIII |
| Et$_3$Al | 43.4 × $10^{-3}$ | 21.7 × $10^{-3}$ | 7.2 × $10^{-2}$ | 15.8 | XIV |
| | 58.2 × $10^{-3}$ | 19.4 × $10^{-3}$ | 5.2 × $10^{-2}$ | 15.1 | XV |
| | 17.3 × $10^{-3}$ | 17.3 × $10^{-3}$ | 18.6 × $10^{-2}$ | 39 | XVI |
| Et$_3$Al$_2$Cl$_3$ | 41.8 × $10^{-3}$ | 20.9 × $10^{-3}$ | 21.3 × $10^{-2}$ | 61 | XVII |
| | 56.1 × $10^{-3}$ | 18.7 × $10^{-3}$ | 22.7 × $10^{-2}$ | 89 | XVIII |
| | 19.9 × $10^{-3}$ | 19.9 × $10^{-3}$ | 10 × $10^{-2}$ | 17 | XIX |
| EtCl$_2$Al | 25.8 × $10^{-3}$ | 17.9 × $10^{-3}$ | 19.4 × $10^{-2}$ | 49.5 | XX |
| | 51.6 × $10^{-3}$ | 17.2 × $10^{-3}$ | 21.7 × $10^{-2}$ | 70.5 | XXI |
| | 21.0 × $10^{-3}$ | 21.0 × $10^{-3}$ | 1.3 × $10^{-2}$ | 2 | XXII |
| Et$_2$ClAl | 35.8 × $10^{-3}$ | 17.5 × $10^{-3}$ | 1.2 × $10^{-2}$ | 2.8 | XXIII |
| | 55.2 × $10^{-3}$ | 18.4 × $10^{-3}$ | 1.4 × $10^{-2}$ | 4.1 | XXIV |

Polymerization

Same conditions as in Example 7:
polymerization at 70° C. for 24 hours in heptane medium
quantity of BaH$_2$ per 250 cc. reaction flask: 50 × $10^{-6}$ moles.

The results obtained, as a function of the quantities of n-butyl-lithium used, are set forth in Table IXC:

TABLE IXC

| Organo-aluminum compound | Moles active BuLi × $10^{-6}$ | % Conversion | $\eta$ | % trans-1,4 | % 1,2 |
|---|---|---|---|---|---|
| | 418 | 48 | 0.72 | 90 | 3 |
| Et$_3$Al | 836 | 100 | 0.48 | 86 | 3 |
| | 1,265 | 100 | 0.34 | 86 | 3 |
| Et$_3$Al$_2$Cl$_3$ | 1,522 | 100 | 0.57 | 85 | 3 |
| | 1,458 | 100 | 0.57 | 84 | 4 |
| | 340 | 100 | 0.71 | 88 | 2.4 |
| | 654 | 100 | 0.50 | 89 | 2.8 |
| Et$_3$Al | 1,064 | 100 | 0.39 | 84 | 4 |
| | 556 | 100 | 1.07 | 87 | 3 |
| Et$_3$Al$_2$Cl$_3$ | 610 | 97 | 0.91 | 78 | 3.7 |
| | 740 | 83 | 0.74 | 86 | 2,.7 |
| EtCl$_2$Al | 540 | 92 | 1.15 | 70 | 5 |
| | 497 | 100 | 1.14 | 71 | 5 |

EXAMPLE 10

Polymerization of Butadiene by Means of the Catalyst Composition n-Butyl-Lithium/Barium Naphthenate/Diethyl Zinc

Preparation of the Barium Catalyst

The barium naphthenate, prepared from commercial naphthenic acid by neutralization with caustic soda in aqueous medium and precipitation by barium chloride, is a salt soluble in toluene medium. There is therefore used an 0.113 mole/liter solution in barium of barium naphthenate in toluene.

Polymerization

Butadiene is polymerized under the same conditions as previously in 250 cc. Steinie bottles, 12.3 g. of butadiene for 123 g. of heptane with 50 × $10^{-6}$ moles of barium naphthenate and 50 × $10^{-6}$ moles of active n-butyl-lithium per flask, for 6 hours at 70° C.

The results, based on the quantities of diethyl zinc introduced, are set forth in Table X.

TABLE X

| Moles of diethyl zinc × $10^{-6}$ | % Conversion | $\eta$ | % trans 1,4 | % 1,2 |
|---|---|---|---|---|
| 100 | 54 | 1.72 | 77 | 5 |
| 200 | 57 | 1.45 | 79 | 5 |

EXAMPLE 11

Butadiene/Vinyl Toluene Copolymerization by Means of the Catalyst Composition n-Butyl-Lithium/Barium Nonylphenate/Triethyl Aluminum In 250 cc. flasks there are copolymerized:
9.24 g. of butadiene
3.08 g. of vinyl toluene (commercial mixture of $\frac{2}{3}$ metamethyl styrene and $\frac{1}{3}$ paramethyl styrene)
123 g. of heptane
50 × $10^{-6}$ moles of active n-BuLi
50 × $10^{-6}$ moles of barium nonylphenate
200 × $10^{-6}$ moles of triethyl aluminum
for 3 hours at 70° C.

The results obtained are as follows:
conversion rate obtained: 64%
$\eta = 0.97$
9% vinyl toluene present in the copolymer
82% trans-1,4 linkages and 3% 1,2 linkages in the polybutadiene phase.

EXAMPLE 12

Butadiene/Tertiobutylstyrene Copolymerization by Means of the Same Catalyst Composition as in Example 11

Per 250 cc. Steinie flask there are introduced:
9.24 g. of butadiene
3.08 g. of tertiobutylstyrene (95% para, 5% ortho)
123 g. of heptane
50 × $10^{-6}$ moles of active n-BuLi
50 × $10^{-6}$ moles of barium nonylphenate
200 × $10^{-6}$ moles of triethyl aluminum,
copolymerization is effected for 5½ hours at 70° C.

The results obtained are as follows:
$\eta = 1.12$
7% tertiobutylstyrene present in the copolymer
85% trans-1,4 linkages and 3% 1,2 linkages

EXAMPLE 13

Mechanical Properties of a Mixture for Rubber Having a Base of Butadiene/Styrene Copolymer with a High Content of Trans-1,4 Linkages and Low Content of 1,2 Linkages 1. Preparation of the Copolymer The catalytic composition of Example 3 or 4 is used:
n-butyl-lithium
preformed cocatalytic system: dibenzoylmethane barium/triethyl aluminum.

The polymerization is carried out in a 10 liter reactor in an atmosphere of rectified nitrogen with:
Solvent: heptane: 5040 g.
Monomers: butadiene: 378 g., styrene: 126 g.
Initiator: active n-butyl-lithium: 1.64 × $10^{-3}$ moles
Cocatalytic system: barium: 1.64 × $10^{-3}$ moles, aluminum 8.2 × $10^{-3}$ moles
for 2 hours at 80° C.

The percentage conversion obtained is 75% and the intrinsic viscosity reached is 1.4.

A tri-chain grafting is then effected by introducing into the medium which is still active 1.64 × $10^{-3}$ moles of diphenyl carbonate in accordance with Michelin French Pat. No. 2,053,786. Reaction is allowed to continue for 20 minutes at a temperature of 80° C. Methanol is then introduced to stop the reaction as well as an antioxidant (0.5% by weight referred to the rubber) and the elastomer (about 380 g.) is recovered by steam distillation of the solvent and drying under vacuum.

The final intrinsic viscosity after grafting has become 1.9. The Mooney viscosity (1 + 3 at 100° C.) is then 45.

The resultant copolymer has the following steric configuration:

75% trans-1,4  } the same for the butadiene portion
5% 1,2

The content of incorporated styrene is 8%.

2. Rubber-Making Mixture

The elastomer described above is used to make a mixture having the following formula:

| elastomer | 100 |
|---|---|
| stearic acid | 2 |
| ZnO | 3 |
| Antioxidant (4010 NA) | 1 |
| carbon black HAF Philblack 0 | 50 |
| Processing oil Sundes 8125 (aromatic) | 5 |
| Santocure | 1 |
| sulfur | 1.6 |

The same mix is prepared with a commercial butadiene-styrene copolymer (SBR 1500) as control. Stress strain measurements are carried out on test pieces of these nonvulcanized mixes (measurement of the green strength).

The results obtained are as follows:

TABLE XIIIA

| | SBR 1500 control | Test SBR |
|---|---|---|
| Elongation upon rupture (%) | 380 | 1,490 |
| Rupture force (g./mm²) | 20 | 92 |
| Maximum force (g./mm²) | 36.5 | 105 |

The mixture prepared with the elastomer in accordance with the invention has a better mechanical strength than the control mixture.

The two mixtures are then vulcanized for 60 minutes at 144° C. The mechanical properties obtained are set forth in Table XIIIB.

TABLE XIIIB

| | SBR 1500 control | SBR in accordance with the invention |
|---|---|---|
| 100% modulus of elongation (kg/cm²) | 20 | 22.5 |
| 300% modulus of elongation (kg/cm²) | 95 | 110 |
| Hysteresis loss at 60° C. (%) | 32.8 | 24.7 |
| Shore hardness | 68 | 70 |
| Elongation at rupture (%) | 665 | 500 |
| Rupture force (kg/cm²) | 250 | 225 |

It is noted that the elastomer produced in accordance with the process of the invention, that is to say the SBR, with a high content of trans-1,4 linkages and a low content of 1,2 linkages, actually has the properties of a rubber and even a good rubber if one considers the low level of hysteresis losses reached.

What is claimed is:

1. A process of homopolymerizing butadiene or copolymerizing butadiene with other conjugated dienes or with vinyl aromatic compounds to form products having simultaneously a high content of more than about 70% of trans-1,4 linkages and a low content of less than about 5% of 1,2 linkages which comprises reacting the monomers in a reaction medium in the presence of an added anionic catalytic composition consisting of (a) an organo-lithium initiator and (b) a cocatalyst system consisting of a compound of barium or strontium and an organometallic compound of aluminum or zinc.

2. The process according to claim 1 wherein the cocatalyst system is preformed and added to the reaction medium at the same time as the organo-lithium initiator at the start of the reaction.

3. The process according to claim 1 wherein the cocatalyst system is preformed and added in one or more batches to the reaction medium during the course of the reaction which had been previously initiated by the organolithium initiator.

4. The process according to claim 1 wherein the components of the cocatalyst system are added to the reaction medium in one of the following ways:
   a. separately at the start of the reaction in one or more batches at the same time as the organo-lithium initiator,
   b. one after the other in any order during the reaction which has been previously initiated by an organo-lithium initiator, or
   c. jointly in one or more batches during the reaction which has been initiated previously by an organo-lithium initiator.

5. The process according to claim 1 wherein styrene is used as the vinyl aromatic compound and the catalytic composition consists of n-butyl-lithium, a barium phenate, and a trialkyl aluminum.

6. The process according to claim 1 wherein the components of the added anionic catalytic composition are present in such quantities that the ratios are within the following limits:

$$0.2 \leq \frac{\text{mole of organometallic compound of Al or Zn}}{\text{mole of compound of Ba or Sr}} \leq 10$$

with $$0.25 \leq \frac{\text{mole of compound of Ba or Sr}}{\text{gram of atom of Li}} \leq 5$$

7. The process according to claim 1 wherein the components of the added anionic catalytic composition are present in such quantities that the ratios are within the following limits:

$$0.5 \leq \frac{\text{mole of organometallic compound of Al or Zn}}{\text{mole of compound of Ba or Sr}} \leq 6$$

with $$0.5 \leq \frac{\text{mole of compound of Ba or Sr}}{\text{gram of atom of Li}} \leq 1.5$$

8. A process of homopolymerizing butadiene or copolymerizing butadiene with other conjugated dienes or with vinyl aromatic compounds to form products having simultaneously a high content of more than about 70% of trans-1,4 linkages and a low content of less than about 5% of 1,2 linkages which comprises reacting the monomers in a reaction medium in the presence of an added anionic catalytic composition consisting of
   a. an organo-lithium initiator selected from the group consisting of metallic lithium, ethyl-lithium, n-butyl lithium, isobutyl-lithium, sec.-butyl-lithium, ter.-butyl-lithium, isopropyl-lithium, n-amyl-lithium, isoamyl-lithium, allyl-lithium, propenyl-lithium, isobutenyl-lithium, polybutadienyl-lithium, polyisoprenyl-lithium, polystyryl-lithium, 1,4-dilithium butane, 1-5-dilithium pentane, 1,20-dilithium eicosane, benzyl-lithium, phenyl-lithium, 1,1-diphenyl-methyl-lithium, the polylithium reaction product of metallic lithium with 1,1-diphenylethylene, the polylithium reaction product of metallic lithium with trans-stilbene, the polylithium reaction product of metallic lithium with tetraphenylethylene, lithium-naphthalene, lithium-anthracene, lithium-chrysene and lithium-diphenyl; and
   b. a cocatalyst system consisting of ($b_1$) a compound of barium or strontium selected from the group consisting of barium hydride, strontium hydride; barium naphthenate, barium methanolate, strontium methanolate, barium ethanolate, strontium ethanolate, barium tertio-butanolate, barium nonylphenate, barium acetylacetonate, strontium acetylacetonate, barium dibenzoylmethane, strontium dibenzoylmethane, barium thenoyltrifluoro-acetonate, strontium thenoyltrifluoro-acetonate, barium benzoyltrifluoro-acetonate, strontium benzolytrifluoro-acetonate, barium benzoyl-acetonate, strontium benzoyl-acetonate, barium 1,1-diphenylethylene, strontium 1,1-diphenylethylene, barium 1,2-acenaphthylene, strontium 1,2-acenaphthylene, barium tetraphenyl-butane, strontium tetraphenyl-butane, barium alpha-methyl-styrene, strontium alpha-methyl-styrene, diphenyl-barium, diphenyl-strontium, bis-cyclopentadienyl-barium, bis-cyclopentadienyl-strontium, barium triphenylsilyl, strontium triphenylsilyl, phenyl-barium iodide, methyl-strontium iodide, barium-benzophenone, strontium-benzophenone, barium-cinnamone, strontium-cinnamone, barium-naphthalene, strontium-naphthalene, barium-anthracene, strontium-anthracene, barium chrysene and strontium-chrysene; and ($b_2$) an organometallic compound of aluminum or zinc selected from the group consisting of diethyl zinc, triethyl aluminum, triisobutyl aluminum, diethyl aluminum chloride, ethyl aluminum dichloride, ethyl aluminum sesquichloride, methyl aluminum sesquichloride, diethyl aluminum hydride and diisobutyl aluminum hydride; said components being present in such quantities that the ratios are within the following limits:

$$0.2 \leq \frac{\text{mole of organometallic compound of Al or Zn}}{\text{mole of compound of Ba or Sr}} \leq 10$$

with $$0.25 \leq \frac{\text{mole of compound of Ba or Sr}}{\text{gram atom of Li}} \leq 5$$

9. The process according to claim 8 wherein cocatalyst system is preformed and added to the reaction medium at the same time as the organo-lithium initiator at the start of the reaction.

10. The process according to claim 8 wherein the cocatalyst system is preformed and added in one or more batches to the reaction medium during the course of the reaction which has been previously initiated by the organo-lithium initiator.

11. The process according to claim 8 wherein the components of the cocatalyst system are added to the reaction medium in one of the following ways:
   a. separately at the start of the reaction in one or more batches at the same time as the organo-lithium initiator,
   b. one after the other in any order during the reaction which has been previously initiated by an organo-lithium initiator, or
   c. jointly in one or more batches during the reaction which has been initiated previously by an organo-lithium initiator.

12. The process according to claim 8 wherein styrene is used as the vinyl aromatic compound and the catalytic composition consists of n-butyl-lithium, a barium phenate, and a trialkyl aluminum.

13. The process according to claim 8 wherein the catalytic composition consists of n-butyl lithium, barium nonylphenate and triethyl aluminum.

14. The process according to claim 8 wherein the catalytic composition consists of n-butyl lithium, dibenzoylmethane barium and triethyl aluminum.

15. The process according to claim 8 wherein the components of the added anionic catalytic composition are present in such quantities that the ratios are within the following limits:

$$0.5 \leq \frac{\text{mole of organometallic compound of Al or Zn}}{\text{mole of compound of Ba or Sr}} \leq 6$$

with $$0.5 \leq \frac{\text{mole of compound of Ba or Sr}}{\text{gram atom of Li}} \leq 1.5$$

* * * * *

UNITED STATES PATENT AND TRADEMARK OFFICE
CERTIFICATE OF CORRECTION

PATENT NO. : 4,080,492

DATED : March 21, 1978

INVENTOR(S) : Yves deZarauz

It is certified that error appears in the above-identified patent and that said Letters Patent are hereby corrected as shown below:

Col. 2, lines 8 and 9, "Mendeleeve" should read -- Mendeleev --.
Col. 3, line 6, "dicloride" should read -- dichloride --.
Col. 7, line 11, "in" should read -- is --. Col. 8, line 1, after "$10^{-2}$" insert -- M --. Col. 11, Table V, second heading, "% Conversion" should read -- % Conversion --; line 56, after "10%" delete the comma. Col. 15, line 6, "methonolate" should read -- methanolate --. The spacing in Tables V, VIIA, IXA, IXB and IXC is incorrect. Tables V, VIIA, IXA, IXB and IXC should read as follows:

TABLE V

| | Time in minutes | % Conversion | % of total weight of styrene present in the copolymer | % trans-1,4 | % 1,2 |
|---|---|---|---|---|---|
| [Al] = [Zn] = 0 | 45 | | | | |
| | 60 | 45 | 13 | 52 | 11 |
| | 90 | | | | |
| | 120 | 58 | 16 | 53 | 10 |
| | 180 | | | | |
| [Al] = 100 μ moles | 45 | | | | |
| | 60 | 46 | 9 | 71 | 5 |
| | 90 | | | | |
| | 120 | | | | |
| | 180 | 72 | 12 | 72 | 4 |
| [Zn] = 100 μ moles | 45 | 37 | 8 | 75 | 5 |
| | 60 | | | | |
| | 90 | 59 | 8 | 75 | 4 |
| | 120 | | | | |
| | 180 | 72 | 13 | 77 | 4 |

UNITED STATES PATENT AND TRADEMARK OFFICE
CERTIFICATE OF CORRECTION

PATENT NO. : 4,080,492

DATED : March 21, 1978

INVENTOR(S) : Yves deZarauz

It is certified that error appears in the above–identified patent and that said Letters Patent are hereby corrected as shown below:

TABLE VIIA

| Barium Alcoholate | Organo-aluminum | Moles of barium alcoholate | Gram atoms of aluminum | Final concentration of Ba-alcoholate in mole/liter | Yield % | Ref. |
|---|---|---|---|---|---|---|
| Barium methanolate | Triethyl aluminum | $8.6 \times 10^{-3}$<br>$9.05 \times 10^{-3}$<br>$9.5 \times 10^{-3}$ | $25.8 \times 10^{-3}$<br>$18.1 \times 10^{-3}$<br>$9.5 \times 10^{-3}$ | $7.4 \times 10^{-2}$<br>$4.5 \times 10^{-2}$<br>$1.5 \times 10^{-2}$ | 86<br>49.8<br>15.9 | A<br>B<br>C |
| | Tri-iso-butyl aluminum | $7.3 \times 10^{-3}$<br>$8.0 \times 10^{-3}$<br>$8.9 \times 10^{-3}$ | $21.8 \times 10^{-3}$<br>$16.0 \times 10^{-3}$<br>$8.9 \times 10^{-3}$ | $1.9 \times 10^{-2}$<br>$1.6 \times 10^{-2}$<br>$0.75 \times 10^{-2}$ | 26<br>20<br>8.4 | D<br>E<br>F |
| Barium ethanolate | Triethyl aluminum | $8.8 \times 10^{-3}$<br>$9.15 \times 10^{-3}$<br>$9.5 \times 10^{-3}$ | $26.3 \times 10^{-3}$<br>$18.3 \times 10^{-3}$<br>$9.5 \times 10^{-3}$ | $2.9 \times 10^{-2}$<br>$1.5 \times 10^{-2}$<br>$0.5 \times 10^{-2}$ | 32.8<br>16.4<br>5.2 | G<br>H<br>I |
| | Ethyl aluminum sesquichloride | $8.0 \times 10^{-3}$<br>$8.6 \times 10^{-3}$<br>$9.2 \times 10^{-3}$ | $24.0 \times 10^{-3}$<br>$17.2 \times 10^{-3}$<br>$9.2 \times 10^{-3}$ | $2.3 \times 10^{-2}$<br>$1.15 \times 10^{-2}$<br>$0.3 \times 10^{-2}$ | 28.7<br>13.4<br>3.3 | J<br>K<br>L |
| Barium tertio-butanolate | Triethyl aluminum | $9.1 \times 10^{-3}$<br>$9.3 \times 10^{-3}$ | $27.2 \times 10^{-3}$<br>$18.6 \times 10^{-3}$ | $6.2 \times 10^{-2}$<br>$5.5 \times 10^{-2}$ | 68.2<br>59.2 | M<br>N |
| | Ethyl Aluminum sesquichloride | $8.3 \times 10^{-3}$<br>$8.8 \times 10^{-3}$ | $25.0 \times 10^{-3}$<br>$17.6 \times 10^{-3}$ | $1.85 \times 10^{-2}$<br>$2.6 \times 10^{-2}$ | 22.2<br>29.6 | O<br>P |
| | Tri-iso-butyl aluminum | $7.9 \times 10^{-3}$<br>$8.5 \times 10^{-3}$ | $23.7 \times 10^{-3}$<br>$17.0 \times 10^{-3}$ | $4.85 \times 10^{-2}$<br>$3.95 \times 10^{-2}$ | 61.5<br>46.5 | Q<br>R |
| | Ethyl aluminum dichloride | $8.05 \times 10^{-3}$<br>$8.6 \times 10^{-3}$ | $24.2 \times 10^{-3}$<br>$17.2 \times 10^{-3}$ | $3.67 \times 10^{-2}$<br>$0.35 \times 10^{-2}$ | 45.6<br>4 | S<br>T |

UNITED STATES PATENT AND TRADEMARK OFFICE
CERTIFICATE OF CORRECTION

PATENT NO. : 4,080,492
DATED : March 21, 1978
INVENTOR(S) : Yves deZarauz

It is certified that error appears in the above–identified patent and that said Letters Patent are hereby corrected as shown below:

TABLE IXA

Preparation in heptane (100 cc. per Steinie bottle)

| Organo-aluminum compound | Gram atoms of aluminum | Moles $H_2Ba$ | Final concentration of $H_2Ba$ in moles/liter | Yield % | Ref. |
|---|---|---|---|---|---|
| $Et_3Al$ | $20.7 \times 10^{-3}$ | $20.7 \times 10^{-3}$ | $1.5 \times 10^{-2}$ | 9 | I |
|  | $53.6 \times 10^{-3}$ | $26.8 \times 10^{-3}$ | $2.4 \times 10^{-2}$ | 12 | II |
|  | $58.2 \times 10^{-3}$ | $19.4 \times 10^{-3}$ | $1.7 \times 10^{-2}$ | 12 | III |
| $Et_3Al_2Cl_3$ | $24.9 \times 10^{-3}$ | $24.9 \times 10^{-3}$ | $0.21 \times 10^{-2}$ | 1.2 | IV |
|  | $53.2 \times 10^{-3}$ | $26.6 \times 10^{-3}$ | $4.2 \times 10^{-2}$ | 24 | V |
|  | $78.3 \times 10^{-3}$ | $26.1 \times 10^{-3}$ | $6.4 \times 10^{-2}$ | 43 | VI |
| $EtCl_2Al$ | $23.6 \times 10^{-3}$ | $23.6 \times 10^{-3}$ | $0.06 \times 10^{-2}$ | 0.3 | VII |
|  | $46.4 \times 10^{-3}$ | $23.2 \times 10^{-3}$ | $0.1 \times 10^{-2}$ | 0.6 | VIII |
|  | $90.3 \times 10^{-3}$ | $30.1 \times 10^{-3}$ | $0.1 \times 10^{-2}$ | 0.5 | IX |
| $Et_2ClAl$ | $20.2 \times 10^{-3}$ | $20.2 \times 10^{-3}$ | $0.15 \times 10^{-2}$ | 0.9 | X |
|  | $30.4 \times 10^{-3}$ | $15.2 \times 10^{-3}$ | $0.18 \times 10^{-2}$ | 1.4 | XI |
|  | $43.2 \times 10^{-3}$ | $14.4 \times 10^{-3}$ | $0.6 \times 10^{-2}$ | 5.8 | XII |

UNITED STATES PATENT AND TRADEMARK OFFICE
CERTIFICATE OF CORRECTION

PATENT NO. : 4,080,492
DATED : March 21, 1978
INVENTOR(S) : Yves deZarauz

It is certified that error appears in the above-identified patent and that said Letters Patent are hereby corrected as shown below:

TABLE IXB

Preparation in toluene (20 cc. per Steinie Bottle)

| Organo-aluminum compound | Gram atoms of aluminum | Moles $H_2Ba$ | Final concentration of $H_2Ba$ in moles/liter | Yield % | Ref. |
|---|---|---|---|---|---|
| $Et_3Al$ | $21.0 \times 10^{-3}$ | $21.0 \times 10^{-3}$ | $7.3 \times 10^{-2}$ | 11.5 | XIII |
|  | $43.4 \times 10^{-3}$ | $21.7 \times 10^{-3}$ | $7.2 \times 10^{-2}$ | 15.8 | XIV |
|  | $58.2 \times 10^{-3}$ | $19.4 \times 10^{-3}$ | $5.2 \times 10^{-2}$ | 15.1 | XV |
| $Et_3Al_2Cl_3$ | $17.3 \times 10^{-3}$ | $17.3 \times 10^{-3}$ | $18.6 \times 10^{-2}$ | 39 | XVI |
|  | $41.8 \times 10^{-3}$ | $20.9 \times 10^{-3}$ | $21.3 \times 10^{-2}$ | 61 | XVII |
|  | $56.1 \times 10^{-3}$ | $18.7 \times 10^{-3}$ | $22.7 \times 10^{-2}$ | 89 | XVIII |
| $EtCl_2Al$ | $19.9 \times 10^{-3}$ | $19.9 \times 10^{-3}$ | $10 \times 10^{-2}$ | 17 | XIX |
|  | $25.8 \times 10^{-3}$ | $17.9 \times 10^{-3}$ | $19.4 \times 10^{-2}$ | 49.5 | XX |
|  | $51.6 \times 10^{-3}$ | $17.2 \times 10^{-3}$ | $21.7 \times 10^{-2}$ | 70.5 | XXI |
| $Et_2ClAl$ | $21.0 \times 10^{-3}$ | $21.0 \times 10^{-3}$ | $1.3 \times 10^{-2}$ | 2 | XXII |
|  | $35.8 \times 10^{-3}$ | $17.5 \times 10^{-3}$ | $1.2 \times 10^{-2}$ | 2.8 | XXIII |
|  | $55.2 \times 10^{-3}$ | $18.4 \times 10^{-3}$ | $1.4 \times 10^{-2}$ | 4.1 | XXIV |

UNITED STATES PATENT AND TRADEMARK OFFICE
CERTIFICATE OF CORRECTION

PATENT NO. : 4,080,492
DATED : March 21, 1978
INVENTOR(S) : Yves deZarauz

It is certified that error appears in the above-identified patent and that said Letters Patent are hereby corrected as shown below:

TABLE IXC

| Organo-aluminum compound | Moles active BuLi x $10^{-6}$ | % Conversion | $\eta$ | % trans-1,4 | % 1,2 |
|---|---|---|---|---|---|
| $Et_2Al$ | 418 | 84 | 0.72 | 90 | 3 |
|  | 836 | 100 | 0.48 | 86 | 3 |
|  | 1,265 | 100 | 0.34 | 86 | 3 |
| $Et_3Al_2Cl_3$ | 1,522 | 100 | 0.57 | 85 | 3 |
|  | 1,458 | 100 | 0.57 | 84 | 4 |
| $Et_3Al$ | 340 | 100 | 0.71 | 88 | 2.4 |
|  | 654 | 100 | 0.50 | 89 | 2.8 |
|  | 1,064 | 100 | 0.39 | 84 | 4 |
| $Et_3Al_2Cl_3$ | 556 | 100 | 1.07 | 87 | 3 |
|  | 610 | 97 | 0.91 | 78 | 3.7 |
|  | 740 | 83 | 0.74 | 86 | 2.7 |
| $EtCl_2Al$ | 540 | 92 | 1.15 | 70 | 5 |
|  | 497 | 100 | 1.14 | 71 | 5 |

Signed and Sealed this

Twenty-ninth Day of August 1978

[SEAL]

Attest:

RUTH C. MASON
*Attesting Officer*

DONALD W. BANNER
*Commissioner of Patents and Trademarks*